(12) United States Patent
Larsen et al.

(10) Patent No.: US 11,710,011 B2
(45) Date of Patent: Jul. 25, 2023

(54) MEDIA TRANSPORT DEVICE CLEANING CARD WITH RAISED SURFACE ELEMENT

(71) Applicant: KICTeam, Inc., Auburn, ME (US)

(72) Inventors: Joshua Lee Larsen, Turner, ME (US); John Condon, Summer, ME (US)

(73) Assignee: KICTeam, Inc., Auburn, ME (US)

( * ) Notice: Subject to any disclaimer, the term of this patent is extended or adjusted under 35 U.S.C. 154(b) by 0 days.

(21) Appl. No.: 17/650,781

(22) Filed: Feb. 11, 2022

(65) Prior Publication Data

US 2022/0261604 A1 Aug. 18, 2022

Related U.S. Application Data

(60) Provisional application No. 63/239,760, filed on Sep. 1, 2021, provisional application No. 63/239,722, filed (Continued)

(51) Int. Cl.
| | |
|---|---|
| *G06K 13/08* | (2006.01) |
| *B08B 9/00* | (2006.01) |
| *B08B 1/00* | (2006.01) |
| *B32B 7/05* | (2019.01) |
| *B08B 3/04* | (2006.01) |

(Continued)

(52) U.S. Cl.
CPC .......... *G06K 13/0868* (2013.01); *B08B 1/005* (2013.01); *B08B 1/006* (2013.01); *B08B 3/04* (2013.01); *B08B 7/04* (2013.01); *B08B 9/00* (2013.01); *B32B 3/266* (2013.01); *B32B 5/26* (2013.01); *B32B 7/05* (2019.01); *B32B 2250/03* (2013.01); *B32B 2250/20* (2013.01); *B32B 2432/00* (2013.01)

(58) Field of Classification Search
CPC ...... G06K 13/0868; B32B 7/05; B32B 3/266; B32B 5/26; B32B 2250/03; B32B 2250/30; B32B 2432/00; B08B 1/005; B08B 1/006; B08B 3/04; B08B 7/04; B08B 9/00
See application file for complete search history.

(56) References Cited

U.S. PATENT DOCUMENTS

| | | |
|---|---|---|
| 4,645,699 A | 2/1987 | Neveu |
| 6,087,279 A | 7/2000 | Laun |

(Continued)

FOREIGN PATENT DOCUMENTS

| | | |
|---|---|---|
| DE | 10325217 A1 | 12/2004 |
| EP | 0789313 B1 | 1/2003 |

(Continued)

OTHER PUBLICATIONS

Premium Embossed Check Scanner Cleaning Card<br>25 card/box, Advanced Card Technologies (ACT Cleaning Cards), Aug. 22, 2019, available at https://www.actcleaningcards.com/catalog/product_info.php/cPath/25/products_id/130.

(Continued)

*Primary Examiner* — Sharidan Carrillo
(74) *Attorney, Agent, or Firm* — Fox Rothschild LLP

(57) ABSTRACT

A cleaning card for cleaning a media transport device includes a substantially planar surface. At least one of the raised surface elements includes at least one scraping element. Optionally, at least one of the raised surface elements also include surface slits that cause asymmetrical deformation of the raised surface.

5 Claims, 10 Drawing Sheets

Related U.S. Application Data on Sep. 1, 2021, provisional application No. 63/148,956, filed on Feb. 12, 2021.

(51) Int. Cl.
  *B08B 7/04* (2006.01)
  *B32B 3/26* (2006.01)
  *B32B 5/26* (2006.01)

(56) References Cited

U.S. PATENT DOCUMENTS

| | | | |
|---|---|---|---|
| 6,156,407 | A | 12/2000 | Neubauer et al. |
| 6,611,985 | B1 | 9/2003 | Neubauer et al. |
| 7,540,055 | B1 | 6/2009 | Bailey |
| 7,631,390 | B1 * | 12/2009 | Klein ................ B32B 3/00 15/210.1 |
| 7,732,040 | B2 | 6/2010 | Klein et al. |
| 7,846,534 | B2 | 12/2010 | Bouchard et al. |
| 8,323,779 | B2 | 12/2012 | Bailey et al. |
| 10,189,650 | B1 | 1/2019 | Bailey et al. |
| 2005/0210610 | A1 | 9/2005 | Louie et al. |
| 2007/0026198 | A1 * | 2/2007 | Bouchard ............ B08B 1/00 428/174 |
| 2010/0119765 | A1 | 5/2010 | Kabis et al. |
| 2019/0091731 | A1 | 3/2019 | Bailey et al. |
| 2022/0258214 | A1 * | 8/2022 | Condon ............ B32B 27/32 |

FOREIGN PATENT DOCUMENTS

| | | |
|---|---|---|
| JP | 2002025022 A | 1/2002 |
| JP | 2013020572 A | 1/2013 |

OTHER PUBLICATIONS

U.S. Appl. No. 17/650,787, filed Feb. 11, 2022, Cleaning Tool for Chip Card Reader.

* cited by examiner

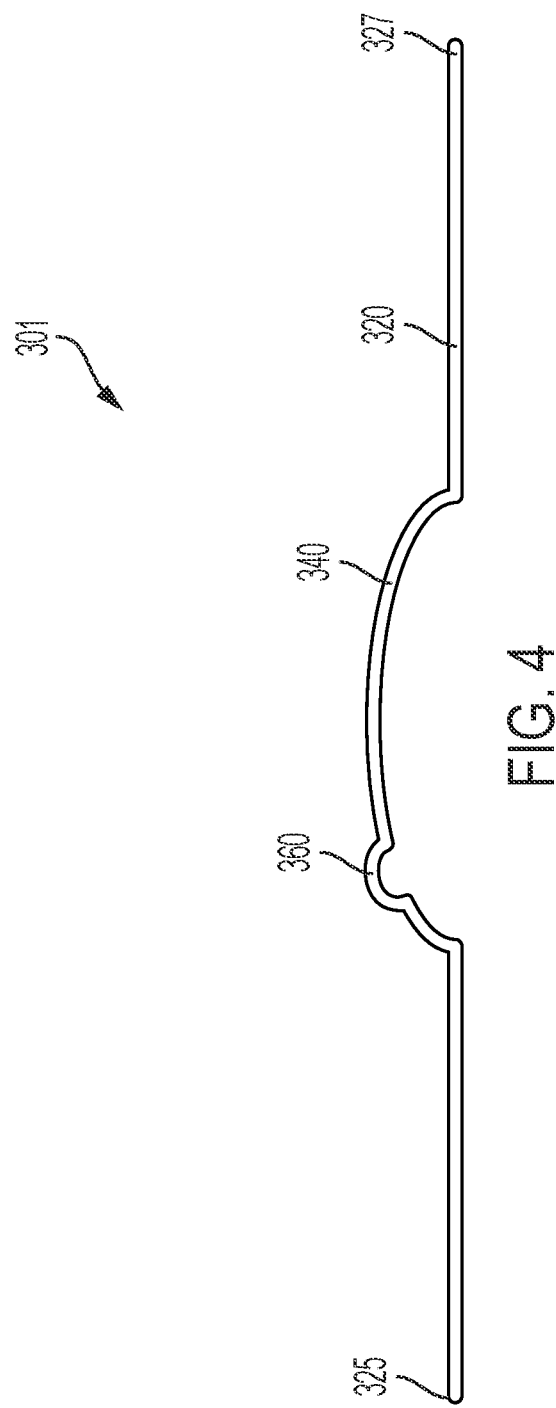

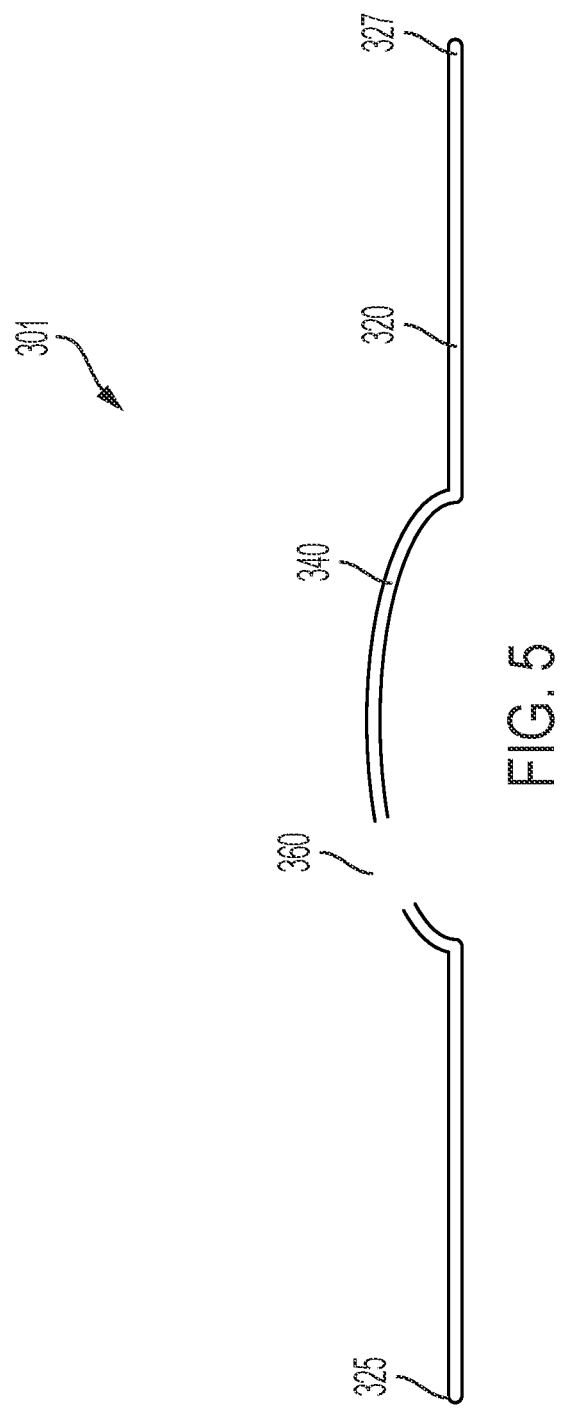

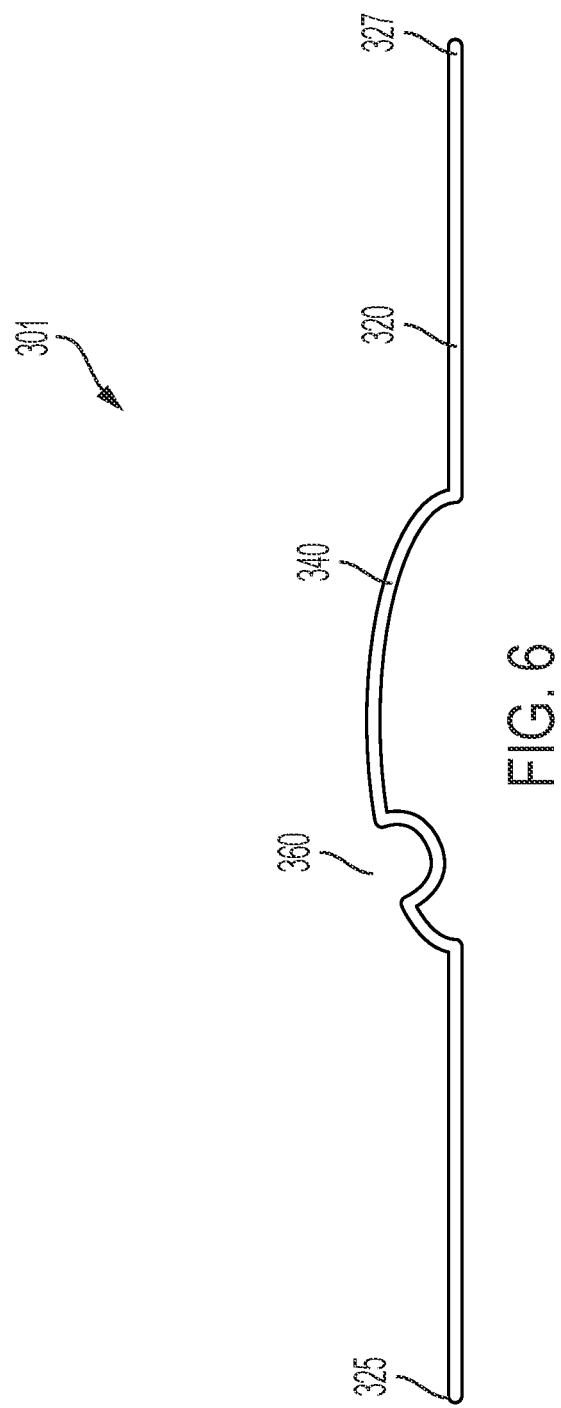

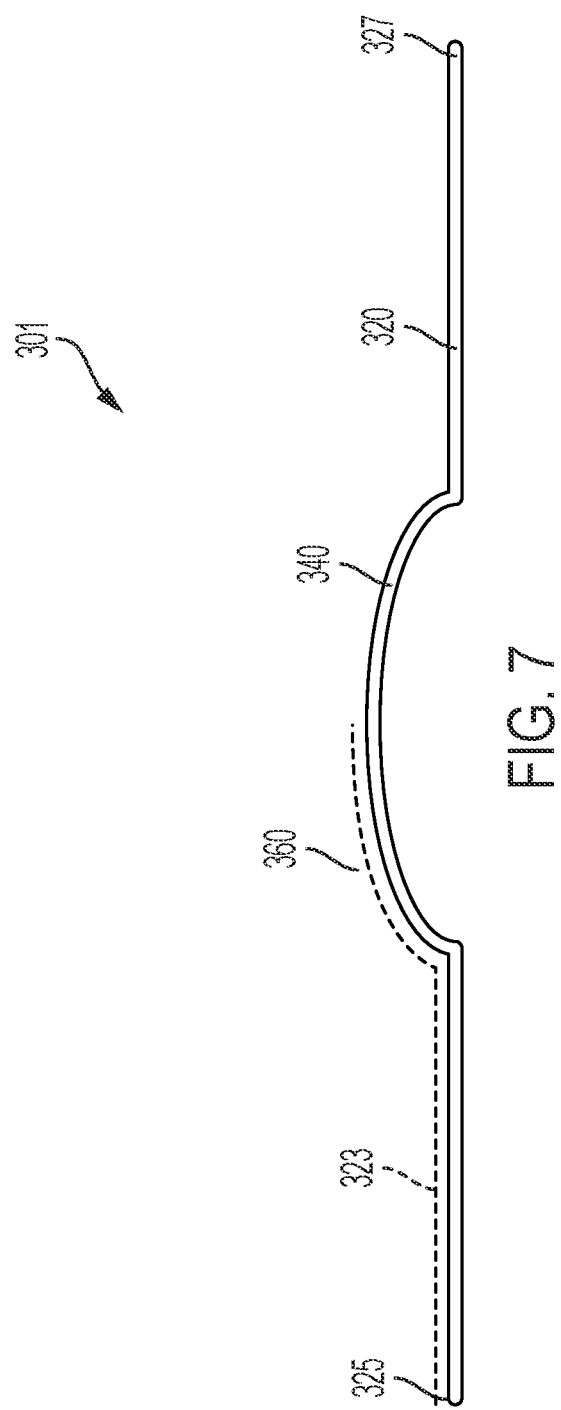

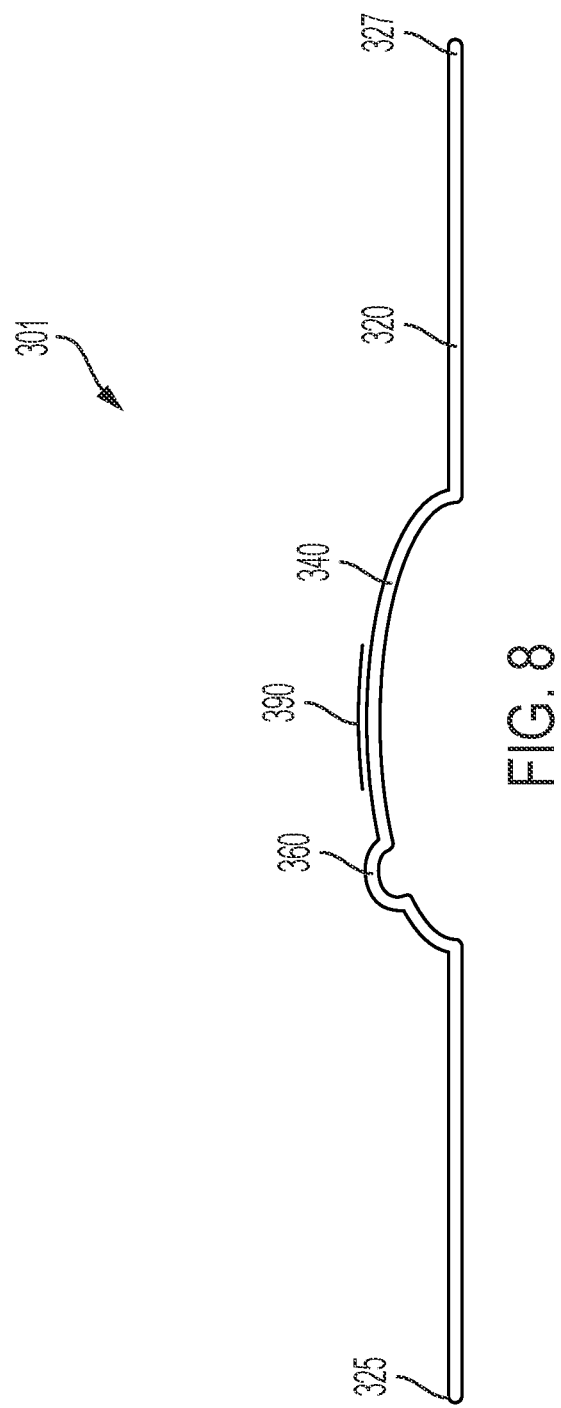

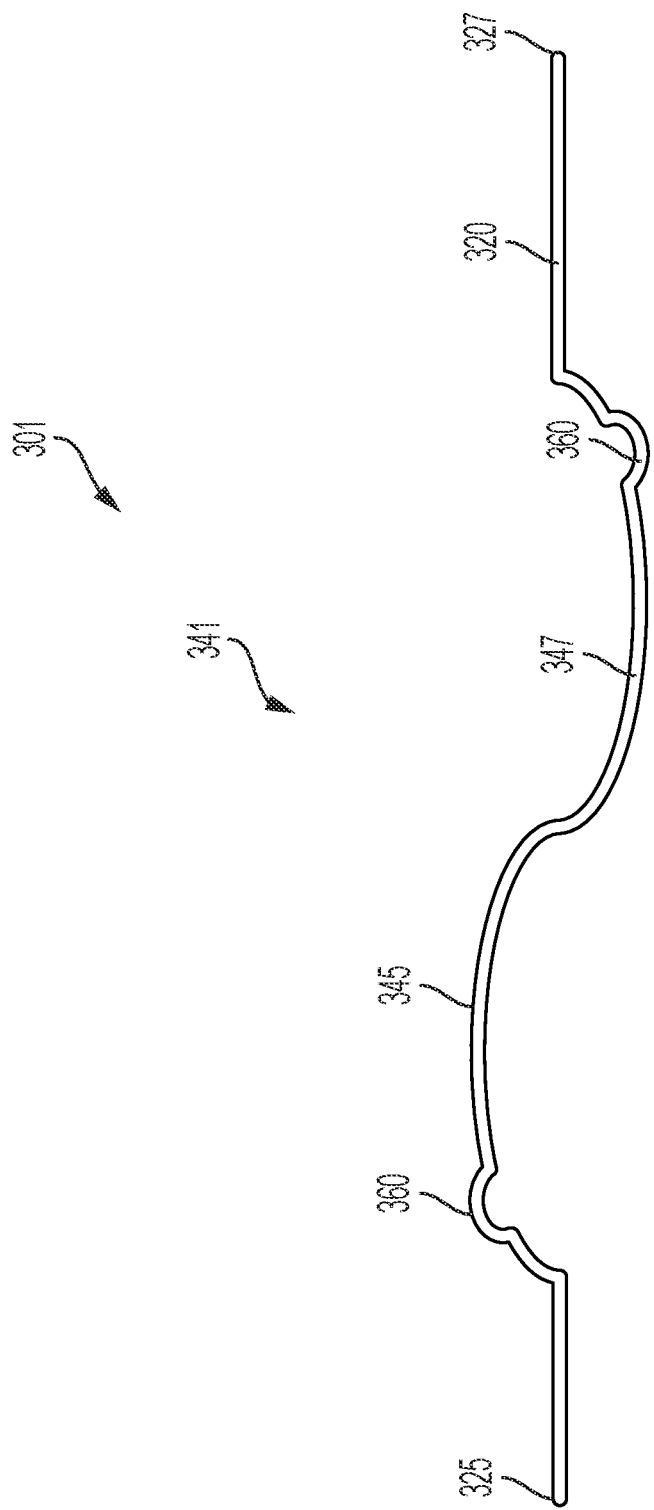

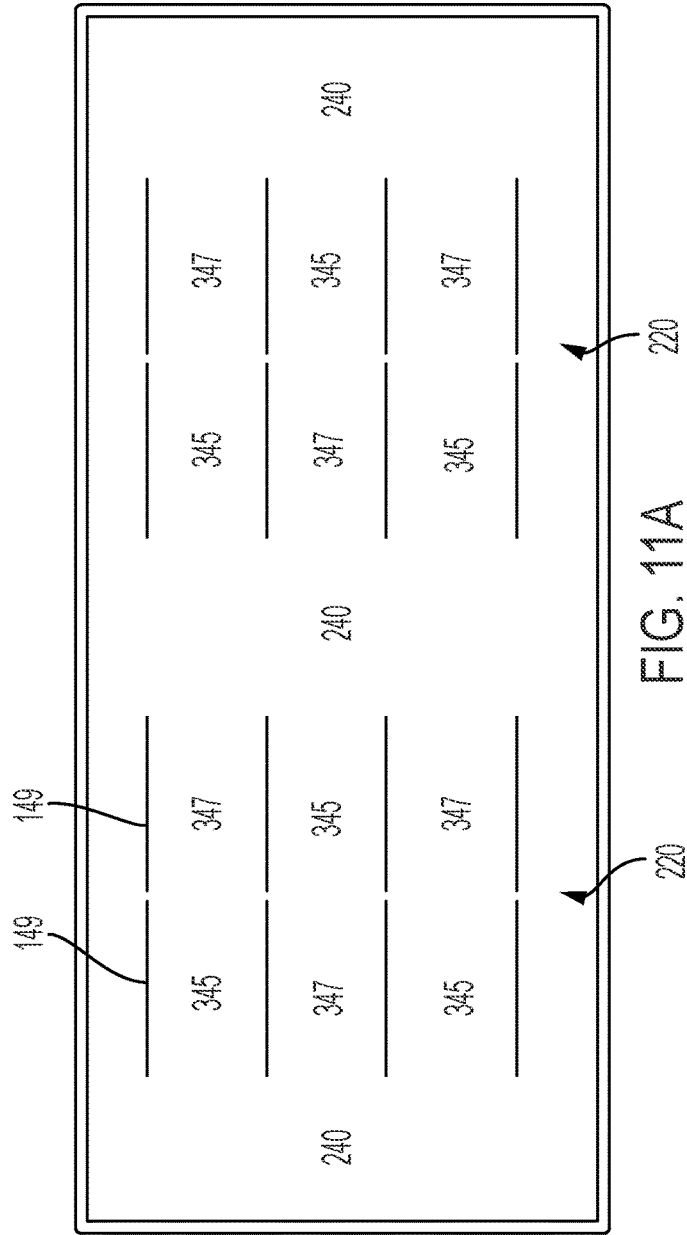
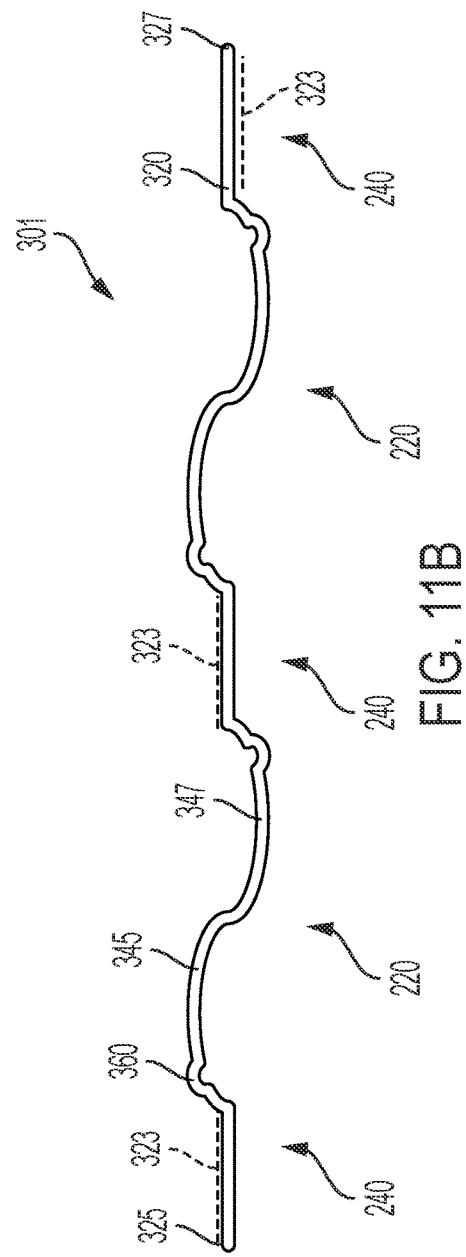

MEDIA TRANSPORT DEVICE CLEANING CARD WITH RAISED SURFACE ELEMENT

RELATED APPLICATIONS AND CLAIM OF PRIORITY

This patent document claims priority to and is a continuation of: (i) U.S. provisional patent application No. 63/148,956, filed Feb. 12, 2021; (ii) U.S. provisional patent application No. 63/239,722, filed Sep. 1, 2021; and (iii) U.S. provisional patent application No. 63/239,760, filed Sep. 1, 2021. The disclosures of each priority application are fully incorporated into this document by reference.

BACKGROUND

Many machines have media transport mechanisms that receive printed media into the machine and move the media through one or more sections of the machine to perform various processes on the media. For example, a financial transaction terminal such as an automated teller machine may do any or all of the following steps: (i) receive printed currency notes, checks, receipts, coupons, tickets and other printed media; (ii) align the media to an internal reference; (iii) use a camera and/or other sensors to detect what the media is and/or what is printed on the media; (iv) apply additional printed markings to the media; and/or (v) move the media to an appropriate shuttle, bin or exit port. The terminal may perform some or all of these steps, and/or additional steps. Other machines that include media transport mechanisms include coupon printers, ticket printers, ticket-taking devices and other printed media handling systems.

For another example, transaction cards, such as credit cards and debit cards, are often used by customers to pay for transactions at a point of sale (POS). For example, as shown in FIG. 1, many such cards 101 include an integrated circuit, generally known as an "EMV chip", "Europay/Mastercard/Visa chip" or simply a "chip" 102, that stores data that the card reader uses to authenticate, authorize and process transactions.

To read an EMV chip card, as illustrated in FIGS. 2A-2B a card reading device includes a housing 203 with a slot that receives the card into the reading device. A sensor inside of the slot detects when the card 101 reaches a reading position inside of the slot. When the card 101 reaches the reading position, a reading head is positioned over or under the area of the card that includes the chip 102. The reading head includes electrical contacts 204 that will move toward the card and interface with the chip 102 to read data from the chip 102. Examples of such card readers are disclosed in, for example, U.S. Pat. Nos. 4,900,273; 6,326,568, and 6,508,673, as well as European Patent Application No. EP0711438, the disclosures of which are fully incorporated into this document by reference.

Other types of card reading devices include that which is known as a "dip reader", in which a chip card is inserted into and quickly retracted from the device, and does not become fully inserted into the device. As a card is inserted into this type of device, it comes in contact with a lever.

Because media transport devices carry transaction cards and other objects that can be handled by human hands, the media transport device can be exposed to various environmental conditions. For example, the insertion of a card into a card reading device can introduce dirt, oil and/or other contaminants into the media transport device. When such contaminants touch a reading device's contacts, reading head or other components of the device, it may cause the reader to malfunction.

Cleaning devices for media transport devices like chip card readers are known. For example, German patent application publication number DE10325217 discloses a card-shaped carrier material with a fiber flock material or a specifically contoured material for cleaning the chips of the card reading device. However, such cleaning cards can be difficult to manufacture, and often must be moved within the device in order to affect a cleaning operation.

This document describes methods and systems directed to solving some of the issues described above, and/or other issues.

SUMMARY

In various embodiments, a cleaning tool for cleaning a media transport device includes a card comprising a substantially planar surface that extends along a machine direction and a transverse direction. A first raised surface element extends from a first side of the card. The first raised surface element comprises a first scraping element that is positioned between a forward edge and a peak of the first raised surface element.

Optionally, the cleaning tool also includes a first edge slit and a second edge slit formed in the planar surface, wherein the first raised surface element and the first scraping element are at least partially between the first edge slit and the second edge slit. A length of the substantially planar surface in the machine direction may be longer than a width of the surface in the transverse direction. The first edge slit and the second edge slit may extend in the machine direction or the transverse direction. Optionally, the first raised surface element also may include a plurality of perpendicular slits, wherein the perpendicular slits are perpendicular to the first and second edge slits.

Optionally, the first raised surface element includes a first arcuate portion that extends from the substantially planar surface in a first direction. If so, the cleaning tool also may include a second raised surface element that comprises (a) a second arcuate portion that extends from the substantially planar surface in a second direction, and (b) a second scraping element that is positioned between a forward edge and a peak of the second raised surface element.

Optionally, the first raised surface element may be compressible and resilient such that at least a portion of it will become relatively more flat when inserted into the media transport device and return to a relatively less flat shape when removed from the media transport device.

Optionally, as noted above the cleaning tool also includes a first edge slit and a second edge slit formed in the planar surface, wherein the first raised surface element and the first scraping element are at least partially between the first edge slit and the second edge slit. If so, also optionally, the first raised surface element may have a surface slit positioned between the first and second edge slits that form the first raised surface element, and the first and second edge slits may each be longer than the surface slit. Also optionally, a contour of the first raised surface element may be the same on each side of the surface slit when the first raised surface element is in a relaxed position, and the contour of the first raised surface element may not be the same on each side of the surface slit when the first raised surface element is in a compressed position.

Optionally, the first scraping element may include any or all of the following: an indent in the first raised surface element; a hole in the first raised surface element; a ridge that extends away from the substantially planar surface, or a polishing surface made of a soft material.

Optionally, the card may have a plurality of embossment regions and a plurality of raised surface element regions, arranged such that the embossment regions and the raised surface element regions alternate along the machine direction of the card. Optionally, at least one of the embossment regions may comprise a textured material. The scraping element may form the textured material.

Any of the cleaning tool embodiments above may be used in a method of cleaning a media transport device, which includes inserting the a cleaning tool into a media transport device and moving the cleaning tool in the media transport device to cause the first scraping element to dislodge contaminants from one or more components of the media transport device.

Optionally, the one or more components comprise at least one electrical contact of the media transport device.

In embodiments where the first raised surface element comprises a first arcuate portion that extends from the substantially planar surface in a first direction and the card also includes a second raised element that comprises a second arcuate portion that extends from the substantially planar surface in a second direction, the first arcuate portion may dislodge the contaminants from the media transport device, and the second arcuate portion may collect the dislodged contaminants from the media transport device.

In embodiments where the first raised surface element has a surface slit positioned between a first and second edge slit, moving the cleaning tool in the media transport device may causes at least one of the components to contact and deform the first raised surface element such that the first raised surface element asymmetrically deforms on opposite sides of the surface slit.

BRIEF DESCRIPTION OF THE DRAWINGS

FIG. 4 illustrates a side view of one example of a cleaning device including a scraping element.

FIG. 5 illustrates a side view of a cleaning device with another example of a scraping element.

FIG. 6 illustrates a side view of a cleaning device with another example of a scraping element.

FIG. 7 illustrates a side view of a cleaning device with another example of a scraping element.

FIG. 8 illustrates a side view of another example of a cleaning device.

FIG. 10 illustrates a side view of another example of a cleaning device.

FIG. 11A illustrates a top view of another example of a cleaning device.

FIG. 11B illustrates a side view of the cleaning device of FIG. 11A.

DETAILED DESCRIPTION

In this document, the singular forms "a," "an," and "the" include plural references unless the context clearly dictates otherwise. The term "comprising" means "including, but not limited to." Similarly, the term "comprises" means "includes, and is not limited to." Unless defined otherwise, all technical and scientific terms used in this document have the same meanings as commonly understood by one of ordinary skill in the art.

In this document, terms that are descriptive of relative position such as "upper" and "lower", "top" and "bottom", "horizontal" and "vertical" and the like are intended to indicate relative positions with respect to the components for which those terms are descriptive, and are not intended to be absolute and require that the component remain in that absolute position in all configurations.

Except where specifically stated otherwise, numeric descriptors such as "first", "second", etc. are not intended to designate a particular order, sequence or position in an overall process or schema, but instead are simply intended to distinguish various items from each other by describing them as a first item, a second item, etc.

The terms "substantially" and "approximately", when used in reference to a value, means a range that is within +/−10% of the value. When used in reference to a feature of an object, such as a substantially planar surface, terms such as "substantially" and "approximately" mean that the primary portion of the object exhibits the feature, although other portions may deviate. For example, a cleaning card in the form of a card from which embossments and/or other raised surface elements extend is considered to be a substantially planar surface.

The terms "media transport system" and "media transport device" refer to a set of hardware components that are configured to receive printed media (i.e., a substrate onto which text and/or graphics have been printed) or digitally encoded media (such as a chip in a credit card) and move the media through one or more modules that perform various processing steps on the media, such as position adjustment, sensing, printing and/or delivery to a final destination. Thus, a card reading device as described in the Background section in this application is a type of media transport device. A "currency transport device" or "currency transport system" is a type of media transport device that is configured to process and convey printed financial instruments such as, currency notes, checks, money orders, bank notes and the like, and digital financial instruments such as credit cards. A "currency transport device" or "currency transport system" is a type of media transport device that is configured to process and convey printed financial instruments such as, currency notes, checks, money orders, bank notes and the like, and digital financial instruments such as credit cards.

Figure 1:
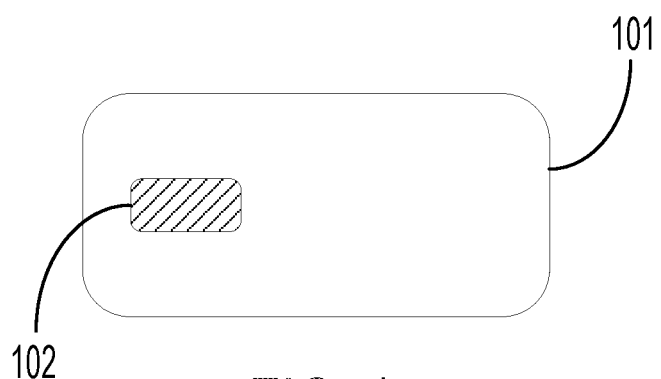
FIG. 1 illustrates components of an example chip transaction card as one exists in the prior art.
Figure 2A:
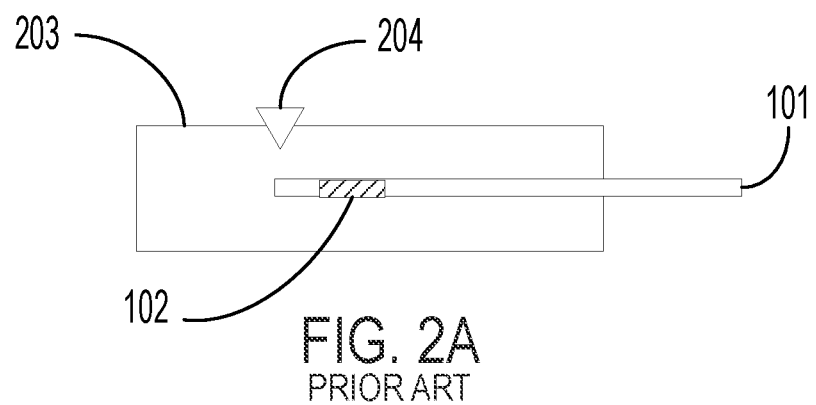
FIGS. 2A-2B illustrate certain elements of a chip card reading device such as is available in the prior art.
Figure 2B:
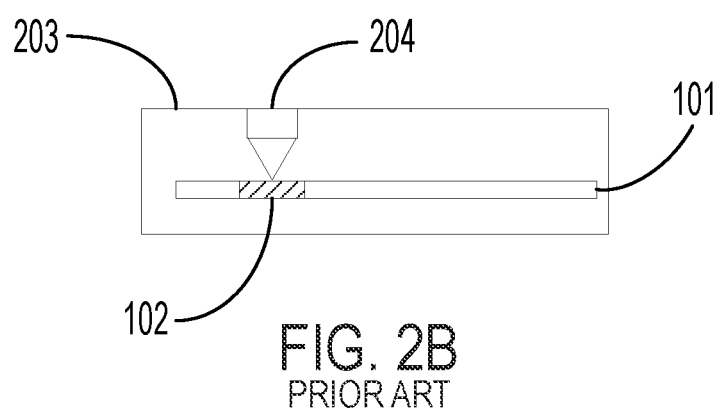
Figure 3A:
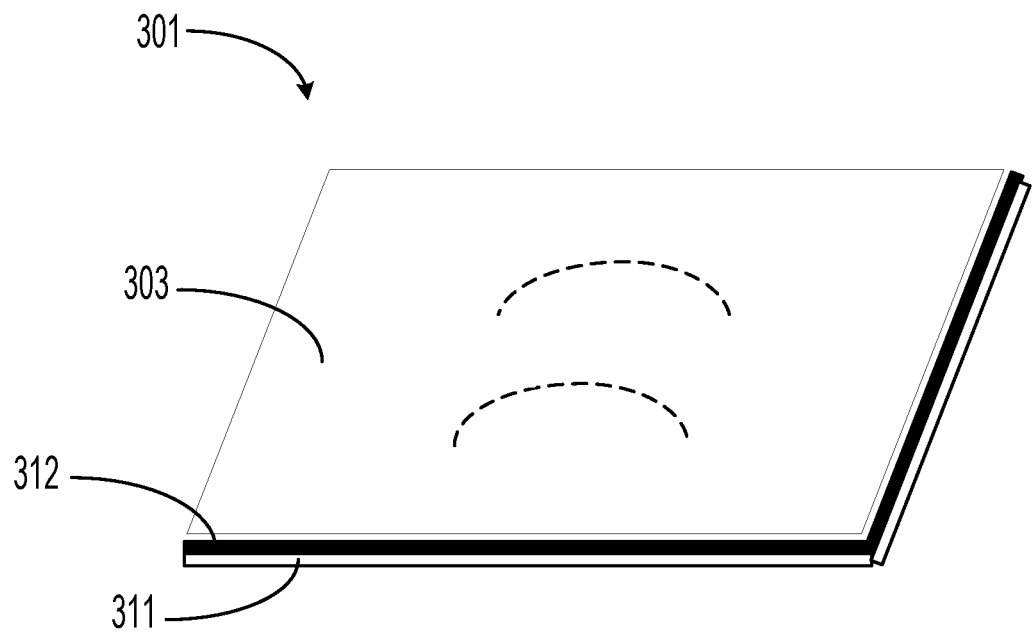
FIGS. 3A and 3B are two views of an example cleaning device.

FIGS. 3A-11b illustrate embodiments of a cleaning device 301 (sometimes referred to in this document as a cleaning tool) for media transport devices such as chip card readers. FIG. 3A shows the cleaning tool 301 from a top front perspective, while FIG. 3B shows the front of the cleaning tool. The cleaning tool is formed of a card having a planar substrate with certain features described below.

The cleaning tool includes a card with a first cleaning surface 303 (shown as the top layer in FIGS. 3A-3B) and an opposing lower support layer 311. The support layer 311 may be made of a flexible, tear-resistant fibrous material such as a fibrous aramid or meta-aramid fabric material such as that marketed under the NOMEX® brand; a cellulosic material; or a flexible polymeric substrate provided with thin, non-woven layers made of absorbent material such as that marketed under the SONTARA® brand. The material of the support layer 311 may provide a cleaning function as the material may contact and wipe across various components of the media transport device as the cleaning tool moves into and out of the device. The first cleaning surface 303 may be the edge of a core layer 312. Alternatively, the cleaning tool may have a distinct core layer 312. The core layer 312 may be made of any material that is flexible and tear-resistant. For example, the core layer 312 may be made of polyvinyl chloride, polypropylene, polyurethane foam, or any similar material. The core layer 312 may be laminated onto or otherwise contacted to the support layer 311. The first cleaning surface 303 may be made of a soft fabric or other soft material such as unbroken loop (UBL) fabric that is attached to the core layer 312. Other materials may include flocked material or other patterned or textured surfaces that provide a cleaning friction. The support layer 311 may be attached to the core layer 312 opposite the first cleaning surface 303. In certain embodiments, the support layer 311 may be omitted.

Optionally, the cleaning tool also may include a second cleaning surface 304. The second cleaning surface 304 may be formed of a fabric or another texture that provides a cleaning friction. The second cleaning surface 304 may be attached to the support layer 311. Alternatively, the support layer 311 may be omitted, and the second cleaning surface 304 may be directly or indirectly attached to the core layer 312. The first cleaning surface 303 may be directly or indirectly attached to a first side of the core layer 312, and the second cleaning surface 304 may be directly or indirectly attached to a second side of a core layer 312.

The layers of the cleaning tool may have differing thicknesses. For example, the support layer may be thicker than the first cleaning surface. Alternatively, the first cleaning surface may be thicker than the support layer. For example, the support layer 311 may have a thickness of 0.01 to 0.23 inches. The core layer 312 may have a thickness of 0.01 to 0.04 inches. In some embodiments, the overall thickness of the uncompressed cleaning tool may be from 0.010 to 0.240 inches, and when compressed the cleaning tool thickness may be not less than 0.010 inches. Other thicknesses are possible.

In certain embodiments the cleaning tool may have layers of varying stiffness. For example, the support layer 311 may be more rigid than the core layer 312. In addition, the first cleaning surface 303, when made of a material that differs from the core layer 312, may be more rigid than the core layer 312.

In certain embodiments the cleaning tool may have layers of varying compressibility. For example, the support layer 311 may be more compressible than the core layer 312. Alternatively, the core layer 312 may be more compressible than the support layer 311.

The cleaning tool may include at least one raised surface element 305, which may be partially elevated above the top plane of the cleaning tool. The raised surface elements 305 may be formed into a portion of the core layer and a corresponding portion of the first cleaning surface 303. Each raised surface element 305 may be compressible and resilient. Each raised surface element 305 includes an extended surface that extends toward a peak in a direction perpendicular to the plane of the cleaning tool. The cleaning tool may have raised surface elements 305 that are all oriented in the same direction with respect to the plane of the card. Alternatively, the cleaning tool may have raised surface elements 305 that are oriented in both directions with respect to the plane of the card. The peak of each raised surface element 305 may be the highest point on the embossment with respect to the plane of the cleaning tool when the card is positioned so that the embossments are raised upward.

The peak may be a single point on the raised surface element 305. The peak may be a ridge on the raised surface element 305. The peak may be an area of the raised surface element 305 that is extended furthest from the plane of the cleaning tool with respect to the rest of the raised surface element. The peak may be large enough to receive an electrical contact of a media transport device. The area surrounding the peak may be rounded, rectangular or otherwise shaped. Alternatively, the peak may form a corner.

Raised surface elements 305 may be patterned to certain locations on the cleaning surfaces of the cleaning tool such that the raised surface elements 305 will come in contact with at least one electrical contact 204 of the chip reading head when the cleaning tool is inserted into a card reading device. The height of the raised surface element may be sufficient to reach at least one electrical contact before the contact has extended to contact the cleaning tool. Alternatively, the raised surface element may contact an electrical contact only when the electrical contact is lowered, raised, or otherwise extended into the embossment. The raised surface elements 305 may be an arcuate extension of one or more layers of the cleaning tool. The raised surface elements 305 may be sufficiently flexible such that when the card reader is activated, the electrical contact extends into and deforms the embossment. The card reader may be activated manually, where the extending of the electrical contact is initiated by a user, or the card reader may be activated automatically, where the extending of the electrical contact is initiated automatically when the card is inserted into the card reading device. In various embodiments, the raised surface element deforms laterally, creating friction between the embossment and the electrical contact. Other structures and use of cleaning cards employing raised surface elements are described in detail in U.S. Pat. No. 8,323,779, the subject matter of which already has been incorporated herein by reference.

Figure 3B:
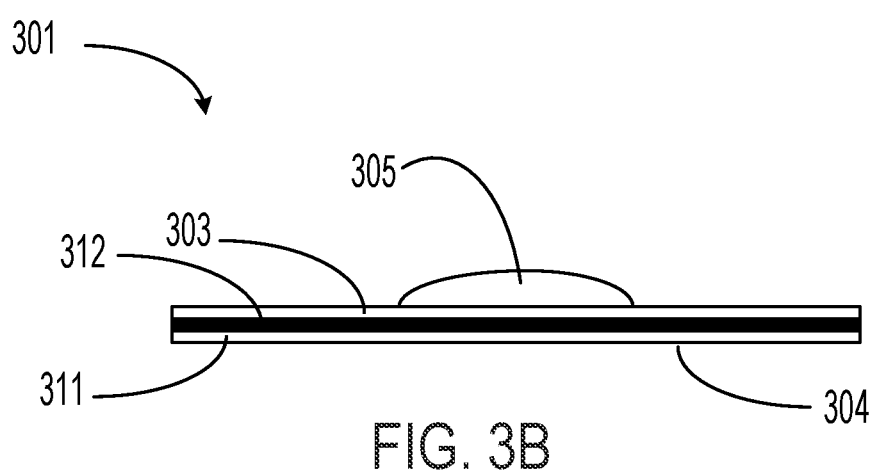

As shown in FIGS. 3B and 4, the various layers of the cleaning device 301 may form a planar card 320. The planar card 320 may be substantially planar, except for raised surface elements 340 (such as the embossments discussed above) or other raised elements that will be discussed below. The planar card 320 may be configured to be inserted into a media transport device. The planar card 320 may have a leading edge 325 and a following edge 327. The leading edge 325 of the planar card 320 is defined as the edge of the planar card 320 that is first inserted into a media transport device. The following edge 327 is defined as the edge of the planar card 320 that is opposite the leading edge 325. The planar card 320 may have a machine direction which is the direction toward the leading edge 325. The planar card 320 may have a transverse direction, which is the direction perpendicular to the machine direction. The planar card 320 may have a length of the surface in the machine direction that is longer than a width of the surface in the transverse direction.

The cleaning device 301 may further include at least one raised surface element 340 that provides a raised cleaning area. The at least one raised surface element 340 will be at least partially raised with respect to the planar surface of the planar card. The at least one raised surface element 340 will have a forward edge, which is the side of the raised element that is nearest to the edge of the planar card 320 that first enters the machine. The at least one raised surface element 340 may also have a peak, which will be the most raised portion of the at least one raised surface element 340. The raised surface elements 340 may be compressible and resilient. The raised surface elements 340 may be configured such that at least a portion of it will become relatively flatter when inserted into the media transport device. The raised surface elements 340 may be configured to return to a relatively less flat shape when removed from a media transport device. Raised surface elements 340 may be partially or fully integrated into the planar card 320. Raised surface elements 340 may be partially elevated in a direction perpendicular to the plane of the planar card 320. In certain embodiments, raised surface elements 340 may be located on specific portions of the planar card 320 to allow the raised surface elements to contact a component of a media transport device when the cleaning device 301 is inserted into the device. Raised surface elements 340 may be elevated to a sufficient height to reach a component of a media transport device, when the cleaning device 301 is inserted into a media transport device. In certain embodiments, raised surface elements 340 may be flanked by a first and second edge slit. (For example, see slits 149 as shown in FIG. 11A). Raised surface elements 340 may be flanked by edge slits 149 that are substantially parallel to each other. Edge slits 149 may be substantially parallel to the machine direction of the planar card 320. Alternatively, edge slits 149 may be perpendicular to the machine direction of the planar card 320. In embodiments having edge slits 149, the raised surface elements 340 may form an arcuate shape, where the ends of the arch are integrated in the planar card 320, and the middle portion of the arch is disconnected from planar card 320. Raised surface elements 340 may extend in either direction with respect to the plane of the planar card 320. The raised surface elements may also include features of cleaning cards from U.S. Pat. Nos. 7,540,055; 7,846,534; or U.S. Pat. No. 8,323,779, the disclosures of which are each fully incorporated into this document by reference.

The raised surface elements 340 of the cleaning device 301 may include one or more scraping elements 360. Each scraping element 360 may be located on the top of a corresponding raised surface element 340. Each scraping element 360 may be centered in the middle of a raised surface element. Alternatively, the scraping element 360 may be positioned off center. In one embodiment, the scraping elements 360 may be positioned off of the center of a raised surface element 340 toward the forward edge 325 of the planar card 320. Each scraping element 360 may be configured such that it contacts a component of a media transport device when the cleaning device 301 is inserted into the media transport device. The scraping elements 360 may be any shape, material, or configuration to allow the cleaning device to dislodge contaminates from a media transport device.

In certain embodiments, as illustrated in FIG. 4, the scraping elements 360 may include a portion that partially extends outward from a raised surface element 340. In such embodiments, the scraping element 360 may include a bump, ridge, embossment, projection, or any other extension from the surface of a raised surface element 340. The scraping element 360 may have an extension with a rounded configuration. Alternatively, the scraping element 360 may have an extension with angled edges. The scraping element 360 may have a structure configured to enhance its rigidity. The scraping element 360 may have a structure configured to enhance its flexibility.

In certain embodiments, as illustrated in FIG. 5, the scraping element 360 may include a hole in a raised surface element 340. In such embodiments, the hole may be a cutout of a raised surface element 340. In alternative embodiments, a hole may be formed by piercing a raised surface element 340, creating a "burst-through" hole. In other embodiments, a hole is formed by cutting a slit into the raised surface element 340. The scraping element 360 may include a hole and extensions in the raised surface element 340. For example, the scraping element 360 may include a hole and an extension at the edge of the hole near the following edge 327. In certain embodiments, a hole of a scraping element 360, may be oriented such that a media device component, such as the pin of a chip reader, may temporarily pass through the hole when the cleaning device 301 is inserted into the media transport device.

In certain embodiments, as illustrated in FIG. 6, the scraping element 360 may include an indent that extends toward the plane of the planar card 320. In such embodiments, the scraping element 360 may include a divot, crease, channel, or any other indented structure. The scraping element 360 may have a rounded indent. Alternatively, the scraping element 360 may have an indent with angled edges. The scraping element 360 may have an indented structure configured to enhance its rigidity. The scraping element 360 may have any combination of the structures shown in FIGS. 4-6, including indentations, extensions, and holes.

In certain embodiments, as illustrated in FIG. 7, the cleaning device 301 may include one or more embossments 323. Embossments 323 may be located on any portion of the planar card 320 and/or the raised surface elements 340, and optionally an embossment 323 may form all or part of a raised surface element 340. The cleaning device 301 may have embossments 323 that function to provide a frictional gripping region on both opposed surfaces of the planar card 320. Additionally, the embossments 323 may function to provide a texture for dislodging contaminates from a media transport device. The exact configuration and pattern of the embossments can be varied widely within the scope of this disclosure. Embossments may provide a sufficient textured surface to permit positive gripping by feed rolls of the machine-reading mechanism to be cleaned. Also, the embossments may provide a sufficiently textured surface to clean feed rolls of the machine mechanism in which the cleaning card is employed. The embossments may be aligned to rollers, belts, sensors and/or other selected components of the media transport device that are in the media travel pathway. In certain embodiments, as illustrated in FIG. 7, an embossment 323 may serve as a scraping element 360 as it is positioned at least partially on a raised surface element 340.

In certain embodiments, as illustrated in FIG. 8, the cleaning device 301 may include a polishing surface 390. The polishing surface 390 may be a soft or textured material applied to part or substantially all of the cleaning card. The polishing surface 390 may comprise any material that would remove contaminates from a component of a media transport device. In certain embodiments, the polishing surface 390 may comprise a polyester. A polishing surface 390 may be located on at least one raised surface element 340. Alternatively, any portion of the cleaning device 301 may comprise a polishing surface 390. A polishing surface 390 may be located substantially at the center of at least one raised surface element 340. In certain embodiments, the polishing surface 390 may be positioned such that the component of the media transport device first contacts a scraping element 160 to remove large contaminates and subsequently contacts the polishing surface 390 to remove smaller contaminates.

The cleaning device 301 may include other structures that are designed to help remove dirt from other card reader receiving pathway components. Such structures may include additional slots, embossments, scarifying holes, or patterned structures such as that disclosed in: (a) U.S. Pat. No.

7,540,055, titled "Cleaning Cards for Internal Surfaces of Machine Components"; (b) U.S. Pat. No. 7,846,534, titled "Cleaning Cards with Angled Cleaning Surfaces"; (c) U.S. Pat. No. 7,732,040, titled "Patterned Cleaning Card and Method of Manufacturing Same"; (d) U.S. Pat. No. 8,323,779, titled "Cleaning Cards"; and/or (e) U.S. Pat. No. 10,189,650 "Card for Cleaning Printed Media Transport System and Method of Using Same", the disclosures of which are each fully incorporated into this document by reference. Such structures may be on the planar card 320, raised surface element 340, or both. Optionally, some portions of the cleaning faces of the cleaning device 301 may be coated with or otherwise contain an adhesive material to help retain dirt or other particles upon contact.

Figure 9:
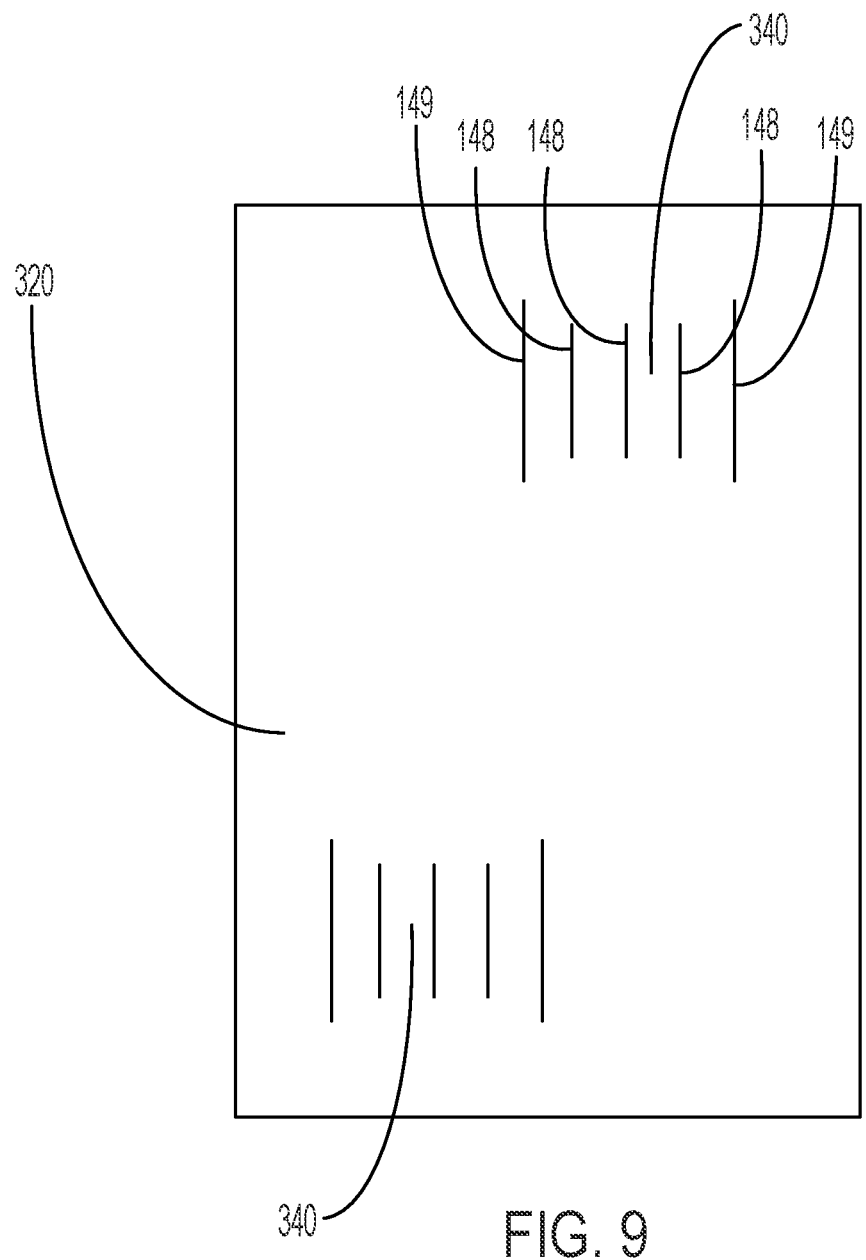
FIG. 9 illustrates a top view of an example of a cleaning device.

As illustrated in FIG. 9, one or more of the raised surface elements 340 may have at least one surface slit 148. A surface slit 148 may be a slit located on a raised surface element 340 between two edge slits 149. In certain embodiments, surface slits 148 may be parallel to edge slits 149. Alternatively, surface slits 148 may be perpendicular to edge slits 149. Surface slits 148 and edge slits 149 may be oriented in the machine direction. Alternatively, surface slits 148 may be oriented in the transverse direction. Surface slits 148 may have a length that is shorter than the length of the edge slits 149. Surface slits 148 may be formed in the card before forming raised surface elements 340 in the card. Alternatively, surface slits 148 may be formed after forming raised surface elements 340 in the card.

When a raised surface element has a surface slit positioned between the edge slits, then during use moving the cleaning card in the media transport device causes at least one of the components of the device to contact and deform that raised surface element such that the raised surface element asymmetrically deforms on opposite sides of the surface slit.

In certain embodiments, as illustrated in FIG. 10, the cleaning device 301 may include at least one cleaning area 341 having a first arcuate portion 345 and a second arcuate portion 347. In certain embodiments, the first arcuate portion 345 may be closer to the leading edge 325 than the second arcuate portion 347 is to the leading edge 325. Alternatively, the first arcuate portion 345 may be further from the leading edge 325 than the second arcuate portion 347 is from the leading edge 325. In an alternative embodiment, the first and second arcuate portions 345, 347 may be aligned in the transverse direction. The first arcuate portion 345 may be oriented in a first direction away from the plane of the planar card 320, and the second arcuate portion 347 may be oriented in a second direction opposite the first direction. As such, the cleaning area 341 may have a "sine wave" appearance when viewed from the side. The first arcuate portion 345 may function to dislodge contaminates from a media transport device. The second arcuate portion 347 may function to capture contaminates that were dislodged by the first arcuate portion 345. The first arcuate portion 345 may include a scraping element 360. The second arcuate portion 347 may have a scraping element 360. In certain embodiments, as illustrated in FIGS. 11A and 11B, the cleaning device 301 may include at least one embossment region 240 and at least one cleaning area region 220. The cleaning device 301 may include a plurality of embossment regions 240. The embossment regions 240 and cleaning area regions 220 may alternate along the length (i.e., the machine direction) of the cleaning device 301. Embossment regions 240 may include embossments 323. Each cleaning area region 220 may include at least one raised surface element. In embodiments with more than one raised surface element in a cleaning area region 220 the raised surface elements may have alternating orientations with respect to the plane of the planar card 320. For example, a first cleaning area may have a first raised surface element that is a first arcuate portion 345 oriented upward and a second raised surface element that is a second arcuate portion 347 oriented downward with respect to the planar card, and an adjacent second cleaning area may have a first arcuate portion 345 oriented downward and a second arcuate portion 347 oriented upward with respect to the plane of the planar card 320.

The cleaning device 301 may be made of a flexible, tear-resistant fibrous material such as a fibrous aramid or meta-aramid fabric material such as that marketed under the NOMEX® brand; a cellulosic material; or a flexible polymeric substrate provided with thin, non-woven layers made of absorbent material such as that marketed under the SONTARA® brand.

The media transport device may thus receive the cleaning device 301 through a portal. The cleaning device 301 may remain fully within the media travel pathway. Alternatively, a portion of the cleaning device may extend out from the media travel pathway, such as through a currency acceptor slot, so long as enough of the cleaning device remains within the pathway to provide a cleaning function. When the cleaning device 301 is inserted into the media transport device, features of the cleaning device 301 including raised surface elements 340, embossments 323, and scraping elements 360 may dislodge contaminants from the media transport machine. Optionally, polishing surfaces 390 may function to remove smaller contaminates from components of a media transport machine. Other features of the cleaning device 301 may function to collect contaminates that were dislodged by the cleaning device 301. For example, a second arcuate portion 347 may collect contaminates. Alternatively portions of the cleaning device 301 may be coated in an adhesive that may captures contaminants.

Optionally, At least one of the layers may be coated with a cleaning solution such as a solvent so that internal components of the media transport system may be cleaned when the components move along or across the cleaning face of the substrate. Example cleaning solutions include isopropyl alcohol, deionized water, alkaline surfactants, and other materials or combinations of these. Alternatively, a cleaning face may be textured or made of fiber that will promote friction when a movable object is moved against the cleaning face.

The cleaning device of this disclosure can be manufactured by embossing patterns into a planar card 320. Specifically, raised surface elements 340 and embossments 323 may be formed into the card by an embossing process in which edge slits 149 are cut along the sides of each raised surface element 340. Embossments may be made by applying heat, pressure or both heat and pressure to press the card into the desired shape. For example, a die may be positioned against the planar card 320 between each edge slit pair, and pressure may be applied to each die while heat is applied to the area of the tool that the die contacts. By way of example, approximately 20 tons of pressure may be applied with a press, with pressure applied less than one second under a temperature ranging 190-260 degrees Fahrenheit, such as approximately 210, 220, 225, 230, 235 or 240 degrees. The raised cleaning areas are then formed as relief areas that extend upward from the planar card. The application of heat alters the structure of the planar card 320 so that the natural (relaxed) position of each raised surface element 340 is in the extended position. Each raised surface element 340 may compress when pressure is applied to the top of the raised cleaning area. The raised surface element 340 may return to its relaxed and extended position when the pressure is removed, and thus exhibit resiliency. In embodiments that have at least one surface slit, the contour of each raised surface element 340 may be the same on each side of the surface slit when the raised surface element is in a relaxed position. The contour of each raised surface element 340 that has a surface slit may not be the same on each side of the surface slit when the raised surface element is in a compressed position.

As an alternative to embossing with pressure and heat, the raised cleaning areas may be formed into the tool via a molding process. For example, the planar card 320 may be cut and placed into a mold that includes ridges at the places where raised cleaning areas will be located, and the planar card 320 will then cure in the raised cleaning area formations, so that they are compressible and resilient. A polishing layer 390 may then be placed over the planar card 320. (See FIG. 9.)

The methods and systems described above may result in significant time savings as compared to manual cleaning. In addition, they can help ensure that cleaning occurs in small and/or hard-to-reach segments within the media transport device.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of cleaning a media transport device, the method comprising:
   inserting a cleaning tool into a media transport device, wherein the cleaning tool comprises:
   a card comprising a substantially planar surface that extends along a machine direction and a transverse direction,
   a first raised surface element comprising a surface that extends from a first side of the card, and
   wherein the first raised surface element further comprises a first scraping element that extends from, indents into, or is a hole within the surface of the first raised surface element and that is positioned between a forward edge and a peak of the first raised surface element; and
   moving the cleaning tool in the media transport device to cause the first scraping element to dislodge contaminants from one or more components of the media transport device.

2. The method of claim 1, wherein the one or more components comprise at least one electrical contact of the media transport device.

3. The method of claim 1, wherein:
   the first raised surface element comprises a first arcuate portion that extends from the substantially planar surface in a first direction;
   the card further comprises a second raised element that comprises a second arcuate portion that extends from the substantially planar surface in a second direction;
   the first arcuate portion dislodges the contaminants from the media transport device; and
   the second arcuate portion collects the contaminants from the media transport device.

4. The method of claim 1, wherein:
   the first raised surface element is flanked by a first edge slit and a second edge slit; the first raised surface element has a surface slit positioned between the first and the second edge slits; and
   moving the cleaning tool in the media transport device causes at least one of the components to contact and deform the first raised surface element such that the first raised surface element asymmetrically deforms on opposite sides of the surface slit.

5. The method of claim 1, wherein:
   the first raised surface element is compressible and resilient;
   inserting the cleaning tool into the media transport device causes at least a portion of the first raised surface element to compress; and
   the method further comprises removing the cleaning tool from the media transport device, which relaxes the first raised surface element and returns the first raised surface element to an extended shape.

\* \* \* \* \*